US008192273B2

(12) United States Patent
Okada

(10) Patent No.: US 8,192,273 B2
(45) Date of Patent: *Jun. 5, 2012

(54) GAME SERVER, GAME CONTROL METHOD, AND GAME MACHINE

(75) Inventor: Kazuo Okada, Tokyo (JP)

(73) Assignee: Universal Entertainment Corporation, Koto-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/183,814

(22) Filed: Jul. 31, 2008

(65) Prior Publication Data

US 2008/0293482 A1 Nov. 27, 2008

Related U.S. Application Data

(63) Continuation of application No. 10/263,820, filed on Oct. 4, 2002, now abandoned.

(30) Foreign Application Priority Data

Oct. 5, 2001 (JP) ................................ 2001-309825

(51) Int. Cl.
*A63F 9/24* (2006.01)
*A63F 13/00* (2006.01)

(52) U.S. Cl. ................ 463/20; 463/16; 463/25; 463/29; 463/42; 273/138.1; 273/138.2; 273/143 R

(58) Field of Classification Search .................... 463/16, 463/20, 25, 29, 40–42; 273/138.1–2, 143 R
See application file for complete search history.

(56) References Cited

U.S. PATENT DOCUMENTS

| | | | |
|---|---|---|---|
| 4,283,709 | A | 8/1981 | Lucero et al. |
| 4,624,459 | A | 11/1986 | Kaufman |
| 4,652,998 | A | 3/1987 | Koza et al. |
| 4,657,256 | A | 4/1987 | Okada |
| 4,669,731 | A | 6/1987 | Clarke |
| 4,718,672 | A | 1/1988 | Okada |

(Continued)

FOREIGN PATENT DOCUMENTS

DE 3242890 A1 5/1984

(Continued)

OTHER PUBLICATIONS

"Pachi-Slot Daizukan 2001" Byakuya-Shobo Co., Ltd. May 12, 2001, pp. 22, 24, 36.

(Continued)

*Primary Examiner* — Dmitry Suhol
*Assistant Examiner* — Ryan Hsu
(74) *Attorney, Agent, or Firm* — Lexyoume IP Group, PLLC.

(57) ABSTRACT

A plurality of game machines installed in a single hall are collectively controlled. Based on information of coin or credit consumption in a certain game machine on which a player is performing a game, this player's cumulative consumption of coin or credit is judged. As the result of this judgment, when this cumulative consumption reaches a predetermined upper limit, a return based on a predetermined return rate is executed without fail to the certain game machine on which this player is performing the game. That is, a predetermined return is guaranteed to a player who has consumed a predetermined amount, so that the player continues the game in expectation of the return. It is therefore avoidable that a player waiting for a prize for a long time keeps away from the hall.

20 Claims, 9 Drawing Sheets

U.S. PATENT DOCUMENTS

| | | | | |
|---|---|---|---|---|
| 4,775,937 | A | 10/1988 | Bell | |
| 4,837,728 | A | 6/1989 | Barrie et al. | |
| 4,964,638 | A | 10/1990 | Ishida | |
| 4,993,713 | A | 2/1991 | Harada | |
| 5,010,995 | A | 4/1991 | Okada | |
| 5,131,655 | A * | 7/1992 | Ugawa | 273/121 B |
| 5,178,390 | A | 1/1993 | Okada | |
| 5,229,764 | A | 7/1993 | Matchett et al. | |
| 5,280,909 | A | 1/1994 | Tracy | |
| 5,429,361 | A | 7/1995 | Raven et al. | |
| 5,509,655 | A * | 4/1996 | Ugawa | 273/121 B |
| 5,564,700 | A | 10/1996 | Celona | |
| 5,611,730 | A | 3/1997 | Weiss | |
| 5,639,088 | A | 6/1997 | Schneider et al. | |
| 5,655,961 | A | 8/1997 | Acres et al. | |
| 5,674,128 | A | 10/1997 | Holch et al. | |
| 5,695,402 | A | 12/1997 | Stupak | |
| 5,702,303 | A | 12/1997 | Takemoto et al. | |
| 5,768,382 | A | 6/1998 | Schneier et al. | |
| 5,770,533 | A | 6/1998 | Franchi | |
| 5,810,665 | A | 9/1998 | Takemoto et al. | |
| 5,820,459 | A | 10/1998 | Acres et al. | |
| 5,836,817 | A | 11/1998 | Acres et al. | |
| 5,836,819 | A | 11/1998 | Ugawa | |
| 5,884,274 | A * | 3/1999 | Walker et al. | 705/4 |
| 5,890,963 | A | 4/1999 | Yen | |
| 5,910,048 | A | 6/1999 | Feinberg | |
| 6,001,016 | A | 12/1999 | Walker et al. | |
| 6,003,013 | A | 12/1999 | Boushy et al. | |
| 6,018,718 | A * | 1/2000 | Walker et al. | 705/14.17 |
| 6,089,980 | A | 7/2000 | Gauselmann | |
| 6,113,493 | A * | 9/2000 | Walker et al. | 463/25 |
| 6,135,884 | A | 10/2000 | Hedrick et al. | |
| 6,196,547 | B1 | 3/2001 | Pascal et al. | |
| 6,224,482 | B1 | 5/2001 | Bennett | |
| 6,234,896 | B1 | 5/2001 | Walker et al. | |
| 6,241,608 | B1 | 6/2001 | Torango | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,312,333 | B1 | 11/2001 | Acres | |
| 6,319,125 | B1 * | 11/2001 | Acres | 463/25 |
| 6,409,602 | B1 | 6/2002 | Wiltshire et al. | |
| 6,439,995 | B1 | 8/2002 | Hughs-Baird et al. | |
| 6,517,433 | B2 | 2/2003 | Loose et al. | |
| 6,575,832 | B1 * | 6/2003 | Manfredi et al. | 463/25 |
| 6,626,758 | B1 | 9/2003 | Parham et al. | |
| 6,638,165 | B2 | 10/2003 | Uchiyama et al. | |
| 6,645,078 | B1 | 11/2003 | Mattice | |
| 6,659,874 | B2 * | 12/2003 | Idaka | 463/42 |
| 6,695,697 | B1 | 2/2004 | Okada | |
| 6,857,958 | B2 | 2/2005 | Osawa | |
| 6,878,063 | B2 | 4/2005 | Manfredi et al. | |
| 6,932,704 | B2 | 8/2005 | Walker et al. | |
| 6,932,707 | B2 | 8/2005 | Duhamel | |
| 6,984,173 | B1 | 1/2006 | Piechowiak et al. | |
| 7,465,232 | B2 * | 12/2008 | Okada | 463/42 |
| 2002/0198039 | A1 | 12/2002 | Marks et al. | |
| 2003/0013516 | A1 | 1/2003 | Walker et al. | |
| 2003/0054873 | A1 | 3/2003 | Peterson | |
| 2003/0064809 | A1 | 4/2003 | Okada | |
| 2003/0064810 | A1 | 4/2003 | Okada | |
| 2003/0069067 | A1 | 4/2003 | Okada | |
| 2003/0069073 | A1 | 4/2003 | Okada | |
| 2003/0073486 | A1 | 4/2003 | Okada | |
| 2003/0073487 | A1 | 4/2003 | Okada | |
| 2003/0078095 | A1 | 4/2003 | Okada | |
| 2003/0119585 | A1 | 6/2003 | Walker et al. | |
| 2003/0220138 | A1 | 11/2003 | Walker et al. | |
| 2004/0048646 | A1 | 3/2004 | Visocnik | |
| 2005/0059480 | A1 | 3/2005 | Soukup et al. | |
| 2006/0009276 | A1 | 1/2006 | Okada | |
| 2007/0060250 | A1 | 3/2007 | Okada | |
| 2007/0060277 | A1 | 3/2007 | Okada | |
| 2007/0060278 | A1 | 3/2007 | Okada | |
| 2007/0060279 | A1 | 3/2007 | Okada | |
| 2007/0060280 | A1 | 3/2007 | Okada | |
| 2007/0060281 | A1 | 3/2007 | Okada | |
| 2007/0060282 | A1 | 3/2007 | Okada | |
| 2007/0060283 | A1 | 3/2007 | Okada | |
| 2007/0060324 | A1 | 3/2007 | Okada | |
| 2007/0105609 | A1 | 5/2007 | Okada | |
| 2007/0105621 | A1 | 5/2007 | Okada | |
| 2007/0105622 | A1 | 5/2007 | Okada | |
| 2007/0149269 | A1 | 6/2007 | Benbrahim | |
| 2008/0058050 | A1 | 3/2008 | Okada | |
| 2008/0058066 | A1 | 3/2008 | Okada | |
| 2008/0064473 | A1 | 3/2008 | Okada | |
| 2008/0064474 | A1 | 3/2008 | Okada | |
| 2008/0064475 | A1 | 3/2008 | Okada | |
| 2008/0064476 | A1 | 3/2008 | Okada | |
| 2008/0096632 | A1 | 4/2008 | Okada | |
| 2008/0102922 | A1 | 5/2008 | Okada | |
| 2008/0102930 | A1 | 5/2008 | Okada | |
| 2008/0119259 | A1 | 5/2008 | Okada | |
| 2008/0119262 | A1 | 5/2008 | Okada | |
| 2008/0125216 | A1 | 5/2008 | Okada | |
| 2008/0139287 | A1 | 6/2008 | Okada | |
| 2008/0139291 | A1 | 6/2008 | Okada | |
| 2008/0146310 | A1 | 6/2008 | Okada | |
| 2008/0153571 | A1 | 6/2008 | Okada | |
| 2008/0161090 | A1 | 7/2008 | Okada | |
| 2008/0214275 | A1 | 9/2008 | Okada | |
| 2008/0293482 | A1 | 11/2008 | Okada | |

FOREIGN PATENT DOCUMENTS

| | | | |
|---|---|---|---|
| DE | 3712841 | A1 | 11/1988 |
| DE | 4137010 | | 8/1992 |
| DE | 10049444 | A1 | 11/2001 |
| EP | 0631798 | | 1/1995 |
| EP | 0840264 | A1 | 5/1998 |
| EP | 1 192 975 | A1 | 4/2002 |
| EP | 1 302 914 | A2 | 4/2003 |
| EP | 1351180 | | 10/2003 |
| EP | 1477947 | | 11/2004 |
| EP | 1544811 | A2 | 6/2005 |
| GB | 2326830 | | 1/1999 |
| JP | S61-118377 | U | 7/1986 |
| JP | H04-244178 | A | 9/1992 |
| JP | 6-70951 | | 3/1994 |
| JP | H06-079051 | A | 3/1994 |
| JP | 07-171262 | | 7/1995 |
| JP | H07-299234 | A | 11/1995 |
| JP | 8-24401 | | 1/1996 |
| JP | H08-029169 | B | 3/1996 |
| JP | H08-336657 | A | 12/1996 |
| JP | A-09-028905 | | 2/1997 |
| JP | 09-094340 | | 4/1997 |
| JP | H09-103576 | A | 4/1997 |
| JP | 09-264777 | | 10/1997 |
| JP | A-10-033820 | | 2/1998 |
| JP | 10-094666 | | 4/1998 |
| JP | 10-118247 | | 5/1998 |
| JP | 10-234945 | | 9/1998 |
| JP | 11-19276 | | 1/1999 |
| JP | 11-146938 | | 6/1999 |
| JP | 11-253640 | | 9/1999 |
| JP | 2000-342772 | A | 12/2000 |
| JP | A-2001-070510 | | 3/2001 |
| JP | 2001-204885 | A | 7/2001 |
| JP | 2001-259205 | | 9/2001 |
| JP | 2001-269441 | | 10/2001 |
| JP | 2003-47775 | | 2/2003 |
| JP | 2003-47779 | | 2/2003 |
| JP | 2003-53041 | | 2/2003 |
| JP | 2003-53042 | | 2/2003 |
| JP | 2003-71096 | | 3/2003 |
| JP | 2003-71097 | | 3/2003 |
| JP | 2003-71098 | | 3/2003 |
| JP | 2003-111888 | | 4/2003 |
| JP | 2003-111889 | | 4/2003 |
| JP | 2003-111890 | | 4/2003 |
| JP | 2003-111891 | | 4/2003 |
| JP | 2003-111897 | | 4/2003 |
| JP | 2003-117053 | | 4/2003 |

| | | |
|---|---|---|
| JP | 2003-117070 | 4/2003 |
| JP | 2003-117071 | 4/2003 |
| JP | 2003-117072 | 4/2003 |
| JP | 2003-117073 | 4/2003 |
| JP | 2003-126343 | 5/2003 |
| JP | 2003-205072 | 7/2003 |
| WO | WO 03083795 A1 | 10/2003 |
| WO | WO-2004/095383 | 11/2004 |

OTHER PUBLICATIONS

U.S. Appl. No. 11/734,834, filed Apr. 13, 2007, Okada.
U.S. Appl. No. 11/734,815, filed Apr. 13, 2007, Okada.
U.S. Appl. No. 11/735,016, filed Apr. 13, 2007, Okada.
U.S. Appl. No. 12/183,721, filed Jul. 31, 2008, Okada.
U.S. Appl. No. 12/183,654, filed Jul. 31, 2008, Okada.
U.S. Appl. No. 12/183,804, filed Jul. 31, 2008, Okada.
U.S. Appl. No. 12/183,588, filed Jul. 31, 2008, Okada.
U.S. Appl. No. 12/183,720, filed Jul. 31, 2008, Okada.
"Trick Monster 2, Pachi-Slot Hisshogaido Max 2001, Oct. 2001" Byakuya-Shobo, Oct. 1, 2001, 4 pages (With English Abstract).
Office Action mailed Aug. 27, 2010, in co-pending U.S. Appl. No. 12/183,804.
Japanese Office Action for Patent Application No. 2007-204699 Issued Aug. 10, 2010.
"Pachi-Slot Hisshogaido", Byakuya-Shobo Co., Ltd., 7th Volume, No. 14, Oct. 1, 1996, pp. 88-89 (with English Abstract).
Office Action mailed Oct. 25, 2010, in co-pending U.S. Appl. No. 11/735,104.
Office Action mailed Oct. 12, 2010, in co-pending U.S. Appl. No. 11/734,993.
Office Action mailed Oct. 27, 2010, in co-pending U.S. Appl. No. 11/735,062.
Office Action mailed Nov. 2, 2010, in co-pending U.S. Appl. No. 12/183,654.
Office Action mailed Dec. 10, 2010, in co-pending U.S. Appl. No. 12/183,720.
Office Action mailed Dec. 14, 2011 in corresponding Japanese Patent Application No. 2007-204698.

* cited by examiner

GAME SERVER, GAME CONTROL METHOD, AND GAME MACHINE

FIELD OF THE INVENTION

The present invention relates to a technique of controlling a return rate to game machines for pachislo game (Japanese slot game), pachinko (vertical pinball game), etc.

BACKGROUND OF THE INVENTION

Generally, a hall is equipped with a plurality of game machines for pachinko game, pachislo game, etc. Each game machine in this hall is constructed so that a game is started with throwing of a game medium such as a pachinko ball or medal, and the game medium is paid out corresponding to the winning state (style) occurred in the course of the game.

This game machine is set such that a winning state occurs at a preset probability. Therefore, the player continues the game in expectation of a prize.

In the game machine that produces a prize merely depending on the probability as described, the probability of prize converges on the preset probability by performing a significant number of games. Accordingly, there is the following occasions: i) a player performing a small number of games has the fortune to get a prize before long; and ii) every player performing a large number of games is not reserved for prize. With the game machine of this type, gambling characteristics can be enhanced to make the game more amusing. On the other hand, the player waiting for a prize for a long time might lose enthusiasm for the game and keep away from the hall (i.e., a reduction in the number of customers).

In order to solve the above disadvantage, for example, there has been proposed the following techniques of: i) controlling return rates to game machines such that the average of the returns rates to all the game machines has a predetermined value (Japanese Patent Unexamined Publication No. 6-79051); and ii) adjusting the probability of prize in consideration of the profit rate of a hall and the return rate to players (Japanese Patent Unexamined Publication No. 11-253640). However, the techniques disclosed in these publications are still not directed to guarantee a return to players, although the players will suffer no unfairness by eliminating variations in the probability of a big prize per game machine.

As a typical slot game machine (slot machine), there is one that employs the following technique: i) depending on the consumed number of games, the probability of a big prize is changed so as to produce the big prize more frequently (Japanese Patent Unexamined Publication No. 8-24401); or ii) the probability of prize on a reel slot is controlled to be changed depending on the medal payout rate during the past certain period of time (Japanese Patent Unexamined Publication No. 11-146938). With the slot game machines employing the above technique disclosed in these publications, the probability of a big prize is increased depending on the consumed number of games. This burdens on a hall controlling a plurality of game machines. As the result, a reduction in the total returnable amount is unavoidable. In other words, the techniques in these publications are not directed to guarantee a return to players.

As a typical medal game machine, there is one that employs a technique of paying out a predetermined number of medals per game machine, when a predetermined wining-prize character occurs (Japanese Patent Unexamined Publication No. 10-118247). However, this medal game machine is set such that the player can receive a profit of bonus when a specific wining-prize character occurs. Therefore, this machine is not directed to guarantee a return to players.

In a casino hall where a plurality of slot machines are disposed, part of credit consumed by every slot machine is reserved. When the amount of reservation reaches a certain sum of money, there is moved to the so-called “jackpot” mode that an exceedingly large amount is paid out to a certain slot machine. Concretely, every slot machine is set so as to produce a prize at a preset probability in the normal mode. Therefore, the player continues a game in expectation of a prize. In the meantime, the jackpot occurs on a certain slot machine at a given timing by lottery that is different from the usual prize lottery based on a preset probability set on the slot machines. In the case that the jackpot is so produced on a certain slot machine only, the sum of money obtained by the jackpot is extremely large. Such gambling characteristics can make the game more interest, whereas the probability of jackpot is extremely low, thereby failing to guarantee a return depending on the sum of money that the player throws in.

SUMMARY OF THE INVENTION

Accordingly, it is an object of the present invention to overcome the above-described technical problem by guaranteeing a return to players for avoiding the reduction of players in the hall.

To accomplish the above object, the present inventor has conceived that a reduction in the number of customers due to a low probability of prize is avoidable by the following manner. In collectively controlling a plurality of game machines disposed in the same hall, a return is executed without fail to a player throwing a predetermined amount of money into a certain game machine, so that a player continuously performing a game in expectation of a prize is also guaranteed a return at a predetermined return rate.

Concretely, the present invention based on this concept is as follows:

(1) A plurality of game machines disposed in a hall are collectively controlled which are brought into a status enabling to start a game based on the number of thrown coins or a given credit number and receive a payout according to the result of the game. In the meantime, based on information about the coin or credit consumption in a certain game machine that a player is performing a game, a cumulative consumption of coin or credit of the player is judged. As the result of this judgment, if the cumulative consumption of coin or credit reaches a predetermined upper limit, a return based on a predetermined return rate is executed without fail, with respect to the certain game machine that the player is performing the game.

With this construction, the player can receive a predetermined return by continuing the game for a while, irrespective of the result of the game itself on the game machine. It is therefore possible to avoid the above-mentioned reduction in the number of customers.

(2) Preferably, the timing of the above-mentioned return is determined by lottery.

With this construction, the player will continue the game in the hope of receiving a return. As the result, the player can also find game amusement in the return itself.

(3) Preferably, when one player performing a game on a certain game machine does not cease from the game, or when there is no change from one player to other player who performs a game on a certain game machine, a return is executed by regarding, as the one player, a player who has continued the game till the predetermined upper limit. That is, the return is executed based on the play status of a player on a certain game machine.

With this construction, a player satisfying return conditions can receive a return. In other words, although a return is executed on a game machine, the return is executed if a player satisfies conditions of a predetermined cumulative consumption of coin or credit on the game machine. As the result, the player can continue a game with a sense of assurance that "a return is assured as long as he/she continues the game on a certain game machine."

(4) Preferably, when one player performing a game on a certain game machine ceases the game, or when one player is changed to other player who performs a game on a certain game machine, a cumulative consumption of coin or credit of the one player who has performed the game on the certain game machine is reset. That is, when the one player ceases the game on the certain game machine, the cumulative consumption of coin or credit of the one player, which has been stored theretofore, is reset.

With this construction, when in place of the one player, other player starts a game, storage of a cumulative consumption of coin or credit is initiated with the reset status. As the result, a return based on predetermined conditions can be executed without unfairness to any player.

(5) Preferably, as a source of execution of return, part of coin or credit consumption on each game machine is stored every time a game is performed, and every return is executed in the range of this source.

With this construction, it is possible to avoid an increase in the burden of a hall or the like that controls a plurality of game machines.

DEFINITION OF TERMS (1) The term "game machine" is to be interpreted in a concept as including pachinko game machines, slot game machines etc., on which a player performs a game by using a game medium such as pachinko balls or medals, and the game medium of the number according to the result of the game is supplied to the player. Further, when a net game is performed on a terminal machine composed of a personal computer, this terminal machine is also included in the concept. Examples of the game medium include, instead of being restricted to pachinko balls and medals, actual cash (paper currency and coins), electric money, and payment by credit card and prepaid card. As a game machine, instead of being restricted to one that performs an internal lottery processing when a game is started, one that expresses the result of the lottery by for example three-reel (rotating-drum) pattern match, there may be used one that detects a pattern combination when the reels are stopped and that judges whether it is hit or miss based on the result of the detection.

(2) The term "credit number" means the number of game medium bet for performing a game.

(3) The term "coin or credit consumption" means the number of game media such as medals used for performing a game.

(4) The term "predetermined upper limit" means such a credit number that a certain player can reach a day's play.

The present invention, advantage in operating the same and aims which is attained by implementing the present invention will be better appreciated from the following detailed description of illustrative embodiment thereof, and the accompanying drawings.

DETAILS DESCRIPTION OF THE PREFERRED EMBODIMENT

One preferred embodiment of the present invention will be described below in detail, based on the accompanying drawings.

[Overall Configuration of System]

Figure 1:
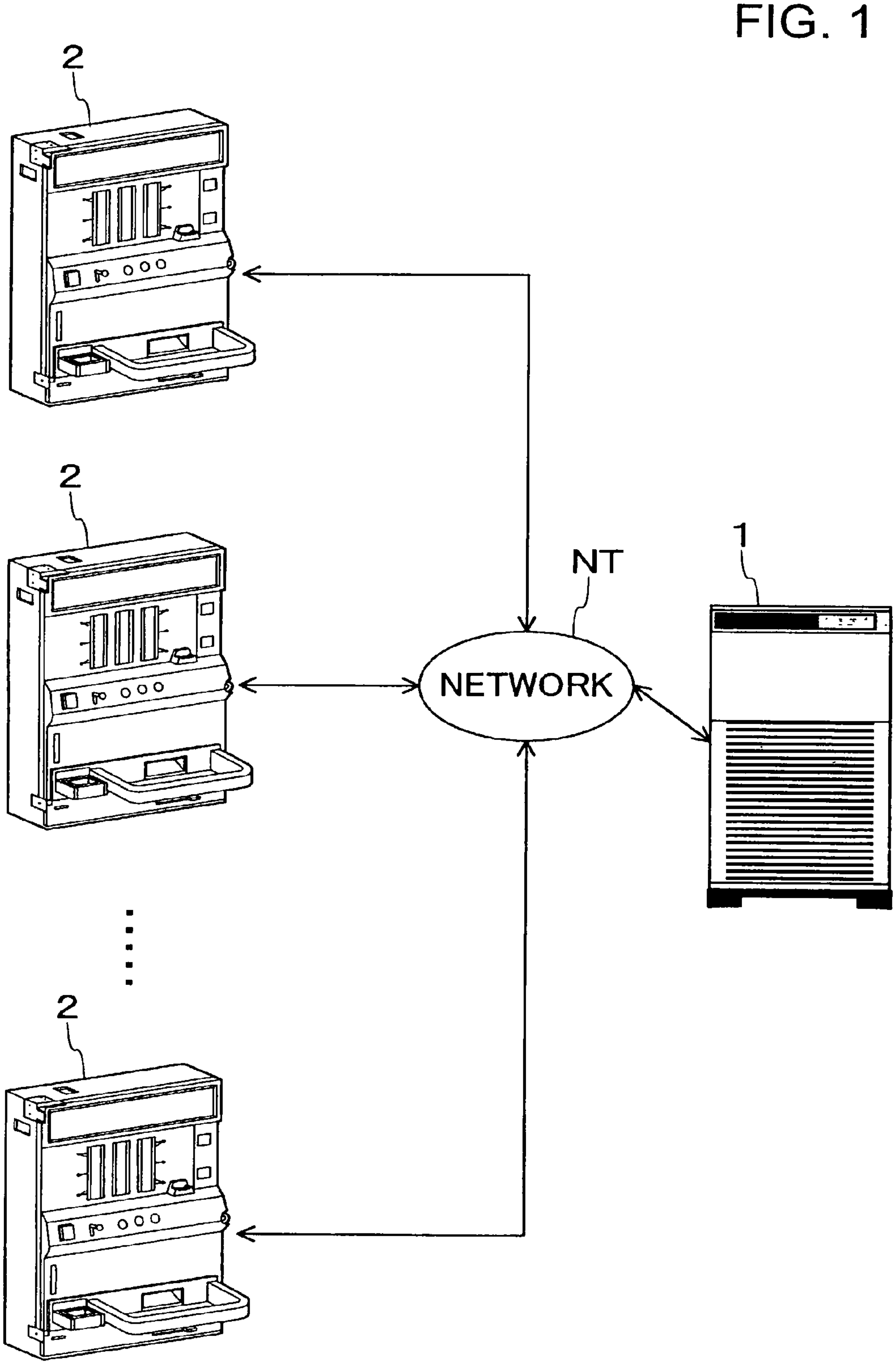
FIG. 1 is a diagram showing, in simplified form, the configuration of a game medium return system according to one preferred embodiment of the present invention.

FIG. 1 is a diagram showing, in simplified form, the configuration of a game medium return system according to one preferred embodiment of the invention. Referring to FIG. 1, this game medium return system comprises: i) a game server 1; and ii) a plurality of game machines 2 installed in a hall.

The game machines 2 are connected via a network NT to the game server 1, so that a variety of information are sent to and received from the game server 1 via the network NT.

The game server 1 collectively controls the plurality of game machines 2 and discriminates the source of data sent from the game machines 2, based on the identification numbers being individual to the game machines 2. When the game server 1 sends data to the game machines 2, the game server 1 designates its destination by using the identification numbers.

In the following description, the term "game server" is merely referred to as a "server."

[Mechanical Configuration of Game Machine]

Figure 2:
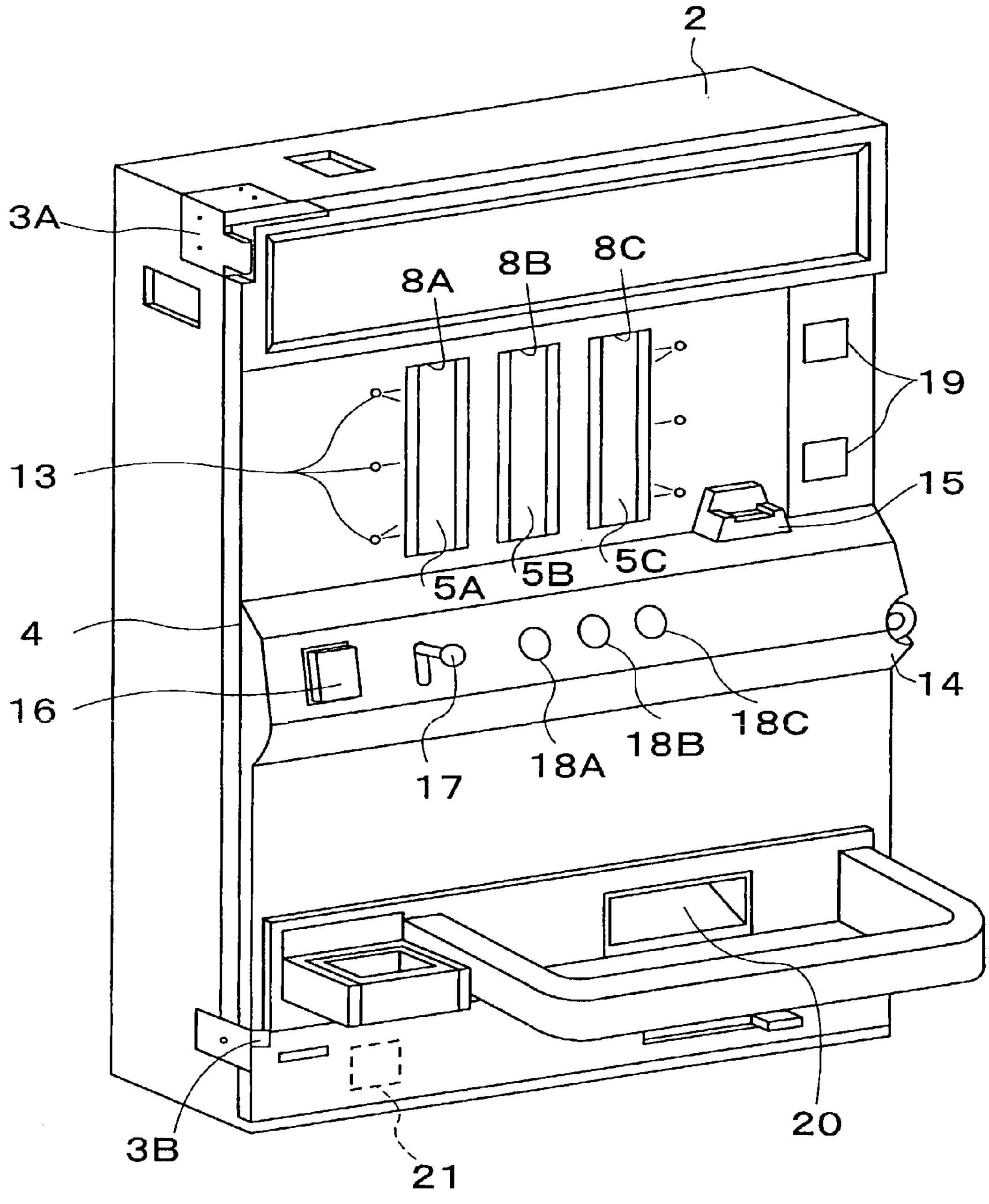
FIG. 2 is a perspective view showing the appearance of a game machine.
Figure 3:
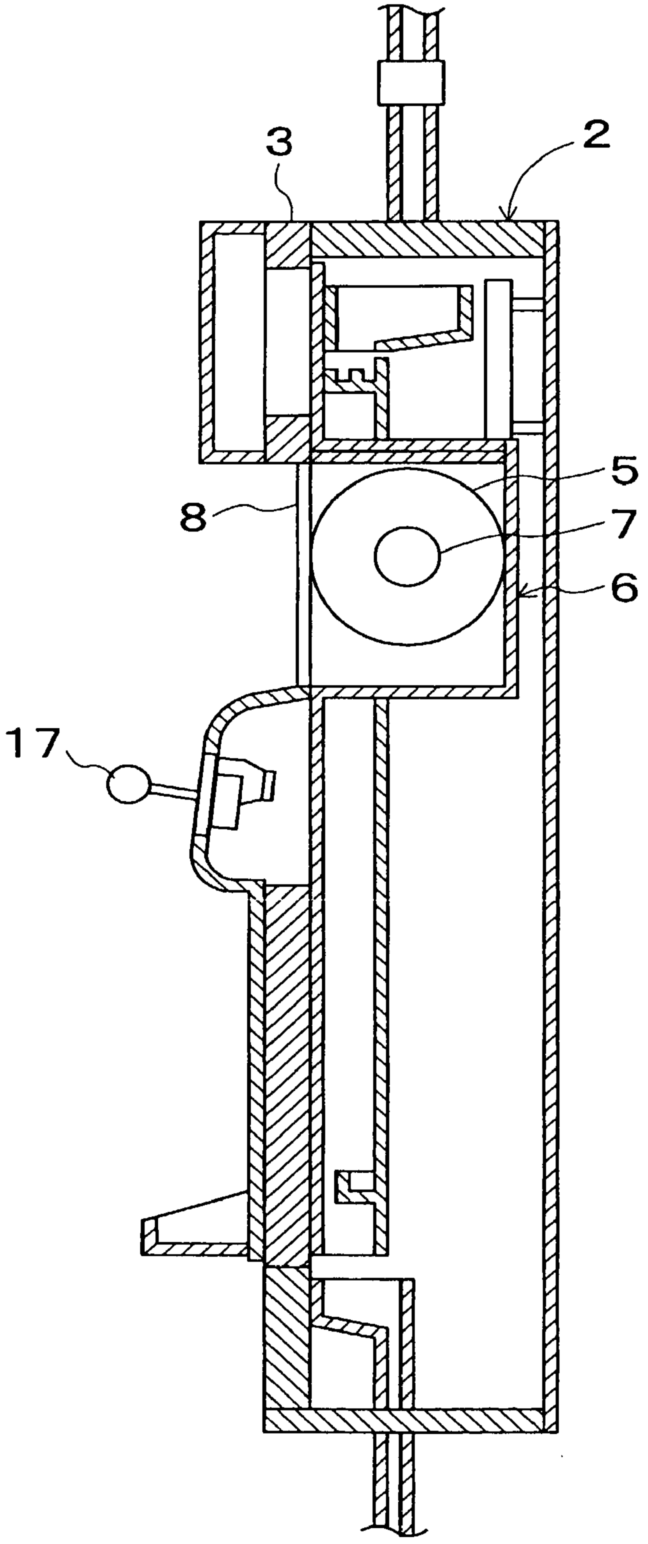
FIG. 3 is a vertical sectional view of the game machine.

FIG. 2 is a perspective view showing the appearance of a game machine. FIG. 3 is a vertical sectional view of the game machine. Referring to FIGS. 2 and 3, a game machine 2 is a slot game machine (slot machine) and has a frame body 3.

The frame body 3 is in the shape of hollow box. A front panel 4 is attached so that it is able to open and shut to the frame body 3 via hinges 3A and 3B.

Attached to the rear surface of the front panel 4 is a casing 6, with which three rotating drums 5 (5A to 5C) arranged across the width thereof are covered from their back face.

The drums 5A to 5C are of tubular shape and are supported rotatively about rotary axes 7. On the peripheral surfaces of the drums 5A to 5C, symbol marks (e.g., figure "7", bell, plum, cherry etc.) are respectively drawn so as to be aligned in a row around their periphery. Of the symbol marks drawn on the peripheral surfaces of the drums 5A to 5C, one symbol mark per drum is visible from the front side of the game machine 2 via windows 8A to 8C disposed on the front panel 4.

The rotary axes 7 of the drums 5A to 5C are attached rotatively via bearings (not shown) to a predetermined bracket (not shown) of the frame of the game machine 2. One ends of the rotary axes 7 are coupled to output axes of stepping motors 11A to 11C (see FIG. 4). Thereby, the drums 5A to 5C are rotatively driven by the stepping motors 11A to 11C, respectively, and controlled such that they are stopped at a predetermined rotational angle position by a control device 12 (see FIG. 4).

Projection parts (not shown) indicating a standard position are disposed on the peripheral end parts of the drums 5A to 5C. The control device 12 detects the rotational standard positions of the drums 5A to 5C when these projection parts cross the optical axes of optical sensors (not shown), which are disposed so as to correspond to the drums 5A to 5C. The rotational speed of the stepping motors 11A to 11C is set so as to make constant a fluctuating display speed of symbol marks.

Bet line indicator lamps 13 are disposed adjacent to the windows 8A to 8C. The lamps 13 have the function of indicating which line of a plurality of symbol mark stop lines displayed on windows 8A to 8C has been selected as an object of bet.

A control part 14 is disposed on the front panel 4. The control part 14 has a bet button 16. The bet button 16 is used in setting the number of medals to be bet among the medals thrown in via a throw-in slot 15. When the player pushes the bet button 16 by the number of medals on which the player desires to bet, the corresponding bet line indicator lamp 13 is light up. The upper limit of bet medals is three in the game machine 2.

The bet line varies depending on the depression number of the bet button 16. Concretely, by one depression, the object of bet is a single line extending horizontally in the middle stage of the windows 8A to 8C. By two depressions, the object of bet amounts to three lines obtained by adding two lines extending horizontally in the upper and lower stages of the windows 8A to 8C, to the above-mentioned line. By three depressions, the object of bet amounts to five lines obtained by adding two lines on the diagonal of the windows 8A to 8C, to the above-mentioned three lines. Four or more depressions are invalid.

When a bet medal number is set according to the above-mentioned procedure, the control device 12 takes medals corresponding to the bet medal number set by the player. Take of the medals establishes the game start conditions. In this state, when the player operates a start lever 17, the control device 12 rotates the drums 5A to 5C. That is, the bet medal number is credit consumption for performing a game.

The control part 14 has three stop buttons 18A to 18C disposed at locations that correspond to the drums 5A to 5C, respectively. Depress of the stop buttons 18A to 18C, the drums stop in response to the depressions.

The front panel 4 has digital indicators 19. The indicators 19 display the following contents: i) the number of medals thrown in before starting a game; ii) the number of medals to be discharged; and iii) the contents of return guarantee (for example, "by consuming 2,500 YEN, 5,000 YEN is returned."). When one of predetermined specific combinations of symbol marks (winning states) in the drums 5A to 5C is aligned on the stop line on which the player bets, a medal payout device discharges a predetermined number of medals to a medal payout tray 20, according to the weight of the combination (the type of a combination of symbol marks).

A player sensor 21 for player detection is disposed on a front part of the game machine 2. The player sensor 21 detects the player seated before the game machine 2. For example, an infrared ray sensor is usable as the player sensor 21. When output level variations in the player sensor 21 continues for a predetermined period of time or more, a CPU 33 (see FIG. 4) judges that a player is seated before the game machine 2. On the other hand, when the output of the player sensor 21 indicates the absence of any player, the CPU 33 activates an internal timer. Then, if the absence of any player continues for a predetermined period of time or more, the CPU 33 judges that the player has ceased playing on the game machine 2. Thereby, even if the player is temporarily apart from the game machine 2, it is not judged that the player has terminated his/her play at that time. Although the presence of any player is judged by the player sensor 21, it is possible to employ the following method of: i) employing a card reader that reads identification cards being individual to players; or ii) disposing a weight sensor in a stool of the game machine 2 such that the presence of any player is judged based on the output of the weight sensor.

[Electrical Configuration of Game Machine]

Figure 4:
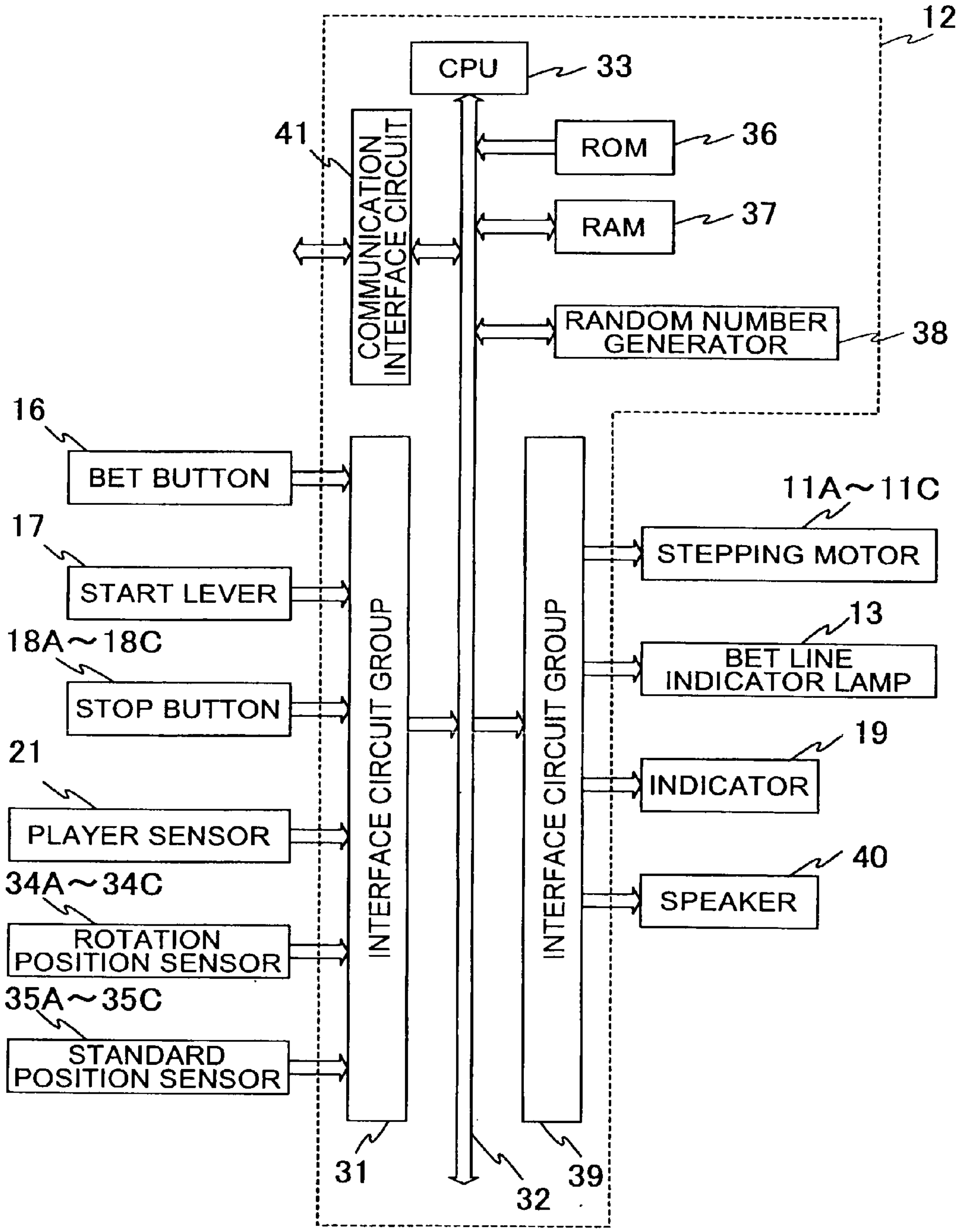
FIG. 4 is a block diagram showing the electrical configuration of the game machine.

FIG. 4 is a block diagram showing the electrical configuration of a game machine. Referring to FIG. 4, a control device 12 of the game machine 2 comprises: i) first interface circuit group 31; ii) input/output bus 32; iii) CPU 33; iv) ROM 36; v) RAM 37; vi) random number generator 38; vii) second interface circuit group 39; and viii) communication interface circuit 41.

The bet button 16 is connected to the first interface circuit group 31 that is connected to the input/output bus 32. When the player depresses the bet button 16, an operation signal is issued from the bet button 16 to the interface circuit group 31. The interface circuit group 31 converts the operation signal to a predetermined voltage signal and provides it to the input/output bus 32. Accordingly, before starting a play, a predetermined number of medals corresponding to a value indicated by the operation signal are thrown into the game machine 2 as the object of bet.

The input/output bus 32 performs input/output of data signals or address signals to the CPU 33.

The start lever 17 and stop buttons 18A to 18C are connected to the first interface circuit group 31. The first interface circuit group 31 converts i) a start-up signal issued from the start lever 17; and ii) a stop signal issued from the stop buttons 18A to 18C, to predetermined voltage signals, and provides these signals to the input/output bus 32.

When the start lever 17 is operated to start a game, the start-up signal is provided to the CPU 33. Receive of the start-up signal, the CPU 33 issues a control signal to the stepping motors 11A to 11C in order to rotate the drums 5A to 5C.

When the stop buttons 18A to 18C are depressed to stop the drums 5A to 5C, the respective stop signals are provided from the stop buttons 18A to 18C to the CPU 33. If desired to stop the first drum 5A, the player operates the first stop button 18A. If desired to stop the second drum 5B, the player operates the second stop button 18B. If desired to stop the third drum 5C, the player operates the third stop button 18C. Receive of the stop signal, the CPU 33 issues the stop signal to the stepping motors 11A to 11C, in order to stop the drum corresponding to the operated stop button.

Rotational position sensors 34A to 34C are connected to the first interface circuit group 31. The sensors 34A to 34C are disposed in the vicinity of the stepping motors 11A to 11C, respectively. The sensors 34A to 34C issue angle position signals that respectively indicate the rotational angle positions of the stepping motors 11A to 11C, to the interface circuit group 31. For example, rotary encoders can be employed as the rotational position sensors 34A to 34C.

Standard position sensors 35A to 35C are connected to the first interface circuit group 31. The sensors 35A to 35C are disposed in the vicinity of the drums 5A to 5C, respectively.

Detect of the standard positions of the drums 5A to 5C, the sensors 35A to 35C issue signals of the standard positions to the interface circuit group 31. The standard position sensors 35A to 35C consist of the above-mentioned optical sensor.

The player sensor 21 is connected to the first interface circuit group 31. When the player sensor 21 detects that a certain player is playing on the game machine 2, it issues a player detection signal to the interface circuit group 31.

The CPU 33 detects: i) angle position signals issued from the rotational position sensors 34A to 34C; and ii) standard position signals issued from the standard position sensors 35A to 35C, thereby obtaining data of symbol marks displayed on the windows 8A to 8C.

The ROM 36 and RAM 37 are connected to the input/output bus 32. The ROM 36 stores: i) a program under which the game machine 2 is controlled so as to pay out a game medium such as medal; and ii) an initial value of variable used in the program. On the other hand, the RAM 37 stores flags and variable values.

More specifically, the ROM 36 stores a data group indicating correspondence between a combination of symbol marks and random numbers. The random number generator 38 for generating the above random numbers is connected to the input/output bus 32. When the CPU 33 issues an instruction for generating random numbers to the random number generator 38, the random number generator 38 generates random numbers in a predetermined range and issues a signal indicating the random numbers to the input/output bus 32. When a random number is issued from the random number generator 38, in order to determine a combination of symbol marks that corresponds to the random number, the CPU 33 searches the above data group and then substitutes a value corresponding to the combination of symbol marks.

The communication interface circuit 41 is connected to the input/output bus 32. The circuit 41 is used in sending and receiving data between the game machine 2 and server 1.

Either one of normal game and special game can be played on the game machine 2.

In the normal game, there are i) an enabled prize-winning status that a combination of symbol marks stopped and displayed on an effective line can match a prize-winning pattern; and ii) unabled prize-winning status that a combination of symbol marks cannot match a prize-winning pattern.

In the unabled prize-winning status, examples of symbol mark combinations that change on effective lines are: i) failure pattern; and ii) small prize pattern. The term "small prize" means that a predetermined number of symbol marks such as "cherry" and "bell" are aligned on an effective line and a few medals are discharged to the payout tray 20. On the other hand, the term "failure pattern" means that, unlike the small prize pattern, symbol marks are not aligned on any effective line and no medals are discharged. The unabled prize-winning status can move to the enabled prize-winning status by an internal lottery processing to be described hereafter. In the unabled prize-winning status, any prize-winning pattern cannot be aligned irrespective of a timing at which the stop buttons 18A to 18C are depressed. Hence, it is impossible to move to the special play status.

On the other hand, only in the enabled prize-winning status, a combination of symbol marks stopped and displayed by a timing at which the stop buttons 18A to 18C are depressed will match a prize-winning pattern. In other words, this state allows for "aiming (observation push)." When a combination of symbol marks stopped and displayed on an effective line matches a prize-winning pattern, the player wins a prize and the game mode moves to the special game providing a chance of obtaining a large number of medals. When the player fails to obtain any prize-winning pattern by missing a timing of depressing the stop buttons 18A to 18C, the above-mentioned failure pattern or small prize pattern is aligned. If once the enable prize-winning status is set, this status continues until a combination of symbol marks stopped and displayed matches a prize-winning pattern. There is no change (move) to the unable prize-winning status.

In the special game, there is extremely high probability that a combination of symbol marks stopped and displayed on an effective line will match a small prize pattern. This leads to a high possibility of obtaining a large number of medals. Finish of the special game, the game mode moves to the normal game. In the case of moving from the special game to the normal game, a decision as to whether the game proceeds in the enabled prize-winning status or the unabled prize-winning status is made by an internal lottery processing to be described later.

The second interface circuit group 39 is also connected to the input/ouput bus 32. To the circuit group 39, there is connected: i) stepping motors 11A to 11C; ii) bet line indicator lamp 13; iii) indicator 19; and iv) speaker 40. The circuit group 39 provides a drive signal or drive power to the above components. For instance, when the player depresses the bet button 16, a drive current is applied to the bet line indicator lamp 13, in order to indicate a bet line that becomes effective in accordance with the number of throw-in medals. When a game is over, a drive signal is applied to the indicator 19, in order to indicate the score corresponding to the prize-winning status at that time. The speaker 40 issues an effect sound corresponding to the game status, when a game begins or terminates.

[Electrical Configuration of Game Server]

Figure 5:
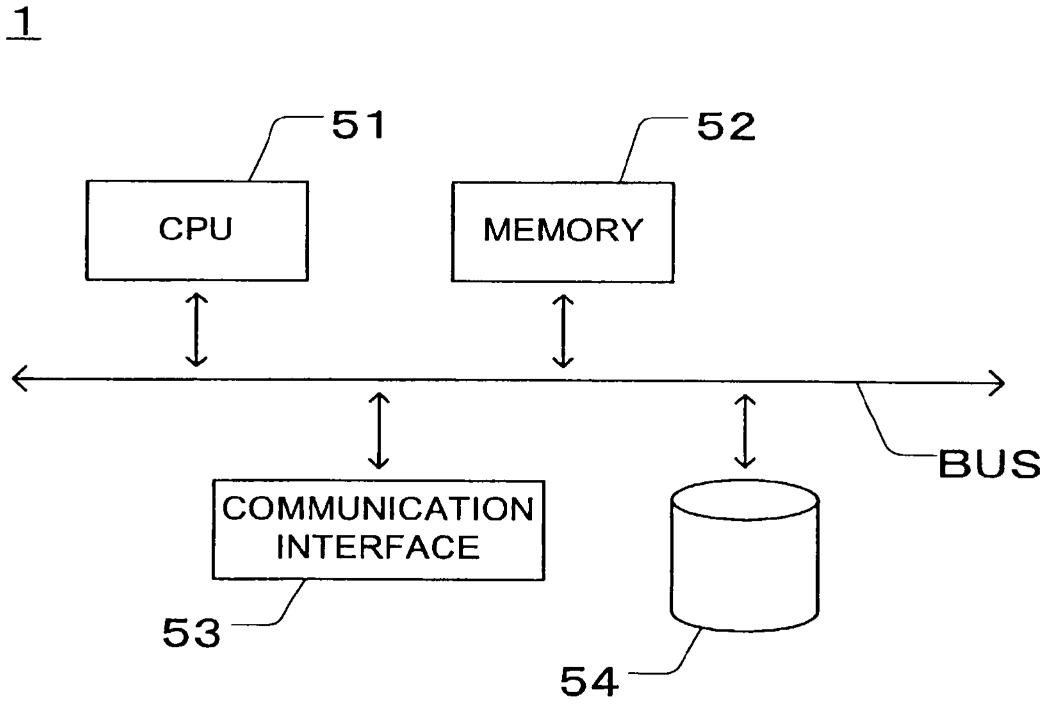
FIG. 5 is a block diagram showing the electrical configuration of a game server.

FIG. 5 is a block diagram showing the electrical configuration of a game server. Referring to FIG. 5, a server 1 has a data bus BUS. To the data bus BUS, there is connected i) CPU 51; ii) memory 52; iii) communication interface 53; and iv) database 54.

The CPU 51 executes various processing according to programs stored in the memory 52. Concretely, the CPU 51 receives data from the game machine 2 via a communication line connected by the communication interface 53, and stores data in the memory 52. This data is for example the upper limit data and return rate data of a plurality of game machines 2 under the control of the server 1, that is, information sent from each game machine 2 under the control of the server 1. The CPU 51 reads a program stored in the database 54 on the memory 52, and progresses the program based on the information sent from each game machine 2 which is stored in the memory 52. The progress of the program is stored in the database 54.

It is assumed in the following, for purposes of description, that the game machine 2 is activated in advance, and flags and variables are initialized to a predetermined value.

[Basic Operation of Game Machine]

Figure 6:
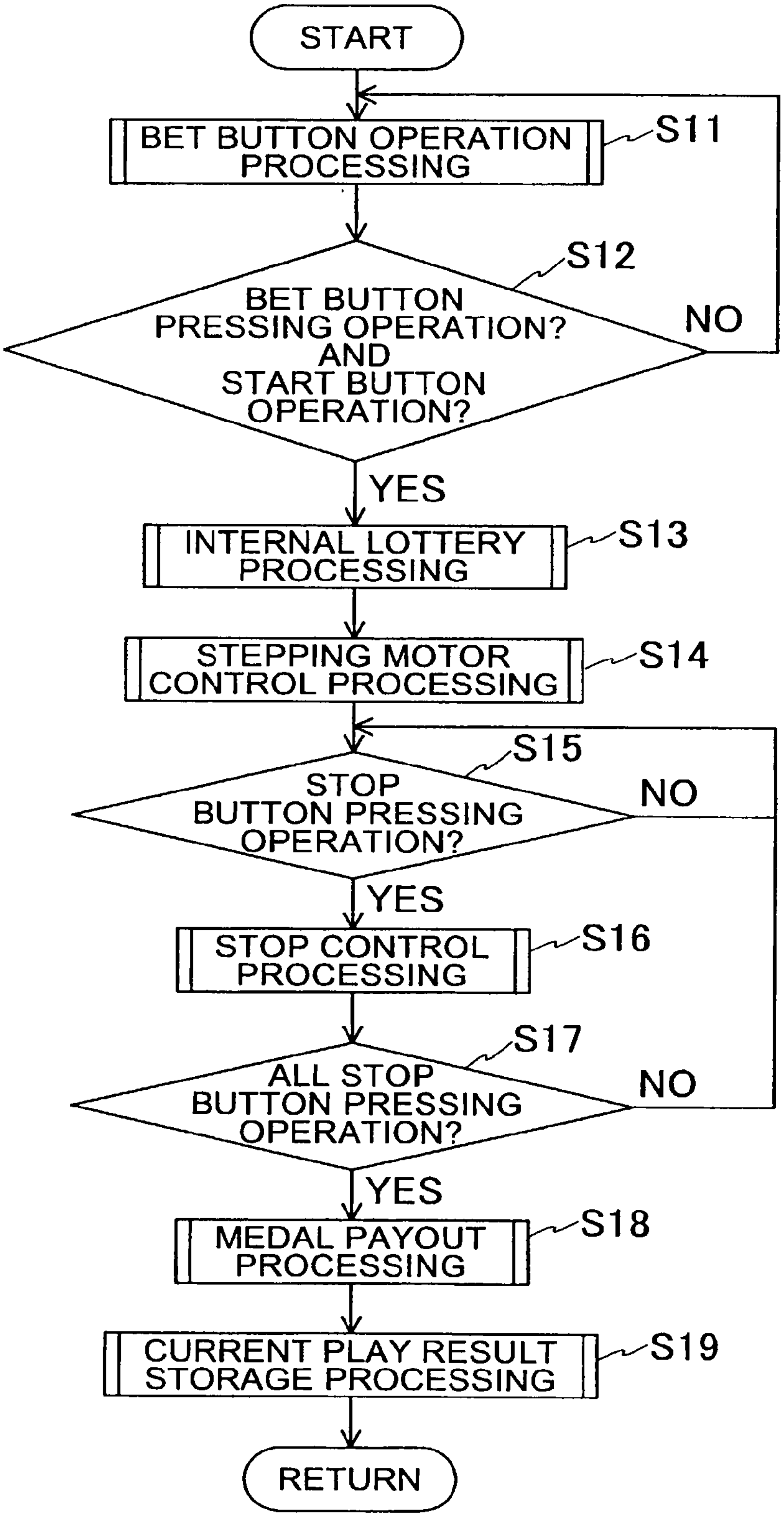
FIG. 6 is a flowchart showing the flow of control of the game machine.

FIG. 6 is a flowchart showing the flow of control of a game machine. Referring to FIG. 6, firstly, the CPU 33 with the game machine 2 judges whether the bet button 16 is depressed by a certain player (step S11). This bet-button operation processing is executed in accordance with the depressing operation to the bet button 16, and includes the following processing: i) detecting whether an operation signal is issued from the bet button 16 in response to the depressing operation to the bet button 16, thereby storing the number of game medals thrown in by the above operation (i.e., a medal credit number); and ii) issuing a drive signal to the bet line indicator lamp 13, in order to indicate the bet line that becomes effective in accordance with the number of throw-in medals.

Complete of the bet-button operation processing, the CPU 33 judges whether the depressing operation to the bet button 16 is performed and the operation of the start lever 17 is performed (step S12). When the CPU 33 judges that both operations are performed, the CPU 33 moves the processing to step S13. On the other hand, when the CPU 33 judges that both are not performed or neither operation is performed, the CPU 33 returns the processing to step S11, and performs the bet-button operation processing again. As will be described hereafter, a period of time that all the drums 5A to 5C are started in rotation and are brought into a stop is a sequence of game (play).

Move to the processing of step S13, the CPU 33 executes an internal lottery processing (step S13). This internal lottery processing includes the following processing of: i) controlling the random number generator 38 to generate random numbers; and ii) searching a data group indicating the correspondence between combinations of symbol marks and random numbers, thereby deciding a combination of symbol marks in accordance with the generated random numbers. The combination of symbol marks stopped and displayed on the previous game is stored in the RAM 37, as will be described hereafter. By the CPU 33, this combination of symbol marks stored in the RAM 37 is read and used for an internal lottery processing in the following game.

In the internal lottery processing, a combination of symbol marks that can be stopped and displayed is determined by lottery, and a value indicating the lottery result is substituted to a lottery data for an ongoing game (i.e., a current game lottery data). For instance, when it is in the unabled prize-winning status and in failure pattern, the current game lottery data is set to “00”. When it is in the unabled prize-winning status and a match with a small prize pattern occurs, the current game lottery data is set to “01”. When it is in the enabled prize-winning status, the current game lottery data is set to “12”. When it is in the special game status and in failure pattern, the current game lottery data is set to “20”. When it is in the special game status and a match with a small prize pattern occurs, the current game lottery data is set to “21”.

Complete of the above-mentioned internal lottery processing, the CPU 33 reads a subroutine about stepping motor control processing (not shown) and issues, based on this subroutine, control signals to the stepping motors 11A to 11C, in order to drive each motor at a predetermined rotational speed (step S14). The term “rotational speed” means a speed at which symbol marks are changeably displayed by the rotation of the drums 5A to 5C in the above-mentioned sequence of games. That is, any speed in transient circumstances, such as immediately after the drums are started in rotation and immediately before they are brought into a stop, is excluded from the concept of the rotational speed.

In this preferred embodiment, there is a lottery data of a game performed in the past (i.e., a past game) that corresponds to the above-mentioned current game lottery data. This past game lottery data is data indicating the lottery result of a game performed before an ongoing game (i.e., a current game), and this data is stored in the RAM 37. As will be described hereafter, in the normal game that is the next to be performed after the special game is over, the past game lottery data is reset before the first game is started. The past game lottery data is updated by sequentially accumulating the current game result in the previous game result.

Complete of the above-mentioned stepping motor control processing, the CPU 33 judges whether the player depressed any one of the stop buttons 18A to 18C, in order to stop the drums 5A to 5C, and a stop signal of the stop buttons 18A to 18C is issued or not (step S15). When the CPU 33 judges that no stop signal is issued from the stop buttons 18A to 18C, the CPU 33 executes again step S15. On the other hand, when the CPU 33 judges that a stop signal is issued from any one of the stop buttons 18A to 18C, the CPU 33 stops the stepping motors 11A to 11C (step S16). This stepping motor stop processing includes: i) controlling the random number generator 38 to generate random numbers; and ii) searching a data group indicating the correspondence between combinations of symbol marks and random numbers, thereby deciding a combination of symbol marks in accordance with the generated random numbers.

The CPU 33 obtains symbol marks currently appearing on the windows 8A to 8C, based on i) rotational position signals issued from the rotational position sensors 34A to 34C; and ii) standard position signals issued from the standard position sensors 35A to 35C. Obtain of the symbol marks, the CPU 33 controls the stepping motors 11A to 11C and decides a stop position, in accordance with the above-mentioned symbol mark data and the current game lottery data set in the above-mentioned internal lottery processing (step S13).

Although the CPU 33 stops the stepping motors 11A to 11C in accordance with the current game lottery data, if judged that any one of the stop buttons 18A to 18C is depressed, the CPU 33 can apply an additional drive to the stepping motors 11A to 11C, under prescribed conditions. Concretely, when any symbol mark corresponding to the current game lottery data cannot be stopped and displayed, an additional drive in the range of the maximum amount of four symbol marks can be applied to the stepping motors 11A to 11C. In this connection, if any symbol mark corresponding to the current game lottery data is not present in that range, it is impossible to stop and display any symbol mark corresponding to the current game lottery data. For instance, even when in the enabled prize-winning status, two drums are already stopped and there is a symbol mark(s) allowing for match with a winning pattern, whether the player obtains the winning pattern depends on the timing at which the player operates the stop button corresponding to the last drum to be stopped. On the other hand, when in the unabled prize-winning status, two drums are already stopped and there is a symbol mark(s) allowing for match with a winning pattern, the stepping motors 11A to 11C are controlled so as not to provide a match with the winning pattern, irrespective of the timing of operation of the stop button corresponding to the last drum to be stopped.

Complete of the above-mentioned stop control processing, the CPU 33 judges whether all the stop buttons 18A to 18C are depressed (step S17). In other words, the processing of step S17 is to judge whether all the stop signals issued in accordance with the operation to the stop buttons 18A to 18C are detected. When the CPU 33 judges that all the stop buttons 18A to 18C are not operated, the CPU 33 returns the processing to the above-mentioned step S15. On the other hand, when the CPU 33 judges that all the stop buttons 18A to 18C are operated, the CPU 33 moves the processing to step S18.

Move to the processing of step S18, the CPU 33 judges whether a combination of symbol marks aligned on an effective line matches with a winning status, and pays out a game medal corresponding to the winning status (step S18). In this medal payout processing, when the CPU 33 judges that the combination of symbol marks aligned in the effective line matches the wining state, the CPU 33 calculates the number of payout game medals corresponding to the winning status, and pays out the number of medals corresponding to the calculated number. Thereafter, the CPU 33 moves the processing to step S19. On the other hand, when the CPU 33 judges that the combination of symbol marks aligned in the effective line does not match the wining state, the CPU 33 performs no game medal payout and moves the processing to step S19.

Move to the processing of step S19, the CPU 33 mainly stores the above-mentioned current game lottery data (step S19). In this preferred embodiment, the CPU 33 reads the past game lottery data from the RAM 37, and directs the RAM 37 to store the current game lottery data in addition to the read past game lottery data. At this time, the RAM 37 stores not only the current game lottery data but also data indicating the symbol marks that have actually been stopped and displayed in the current game. Thereafter, the present subroutine is finished.

[Return Operation in Game Machine]

Figure 7:
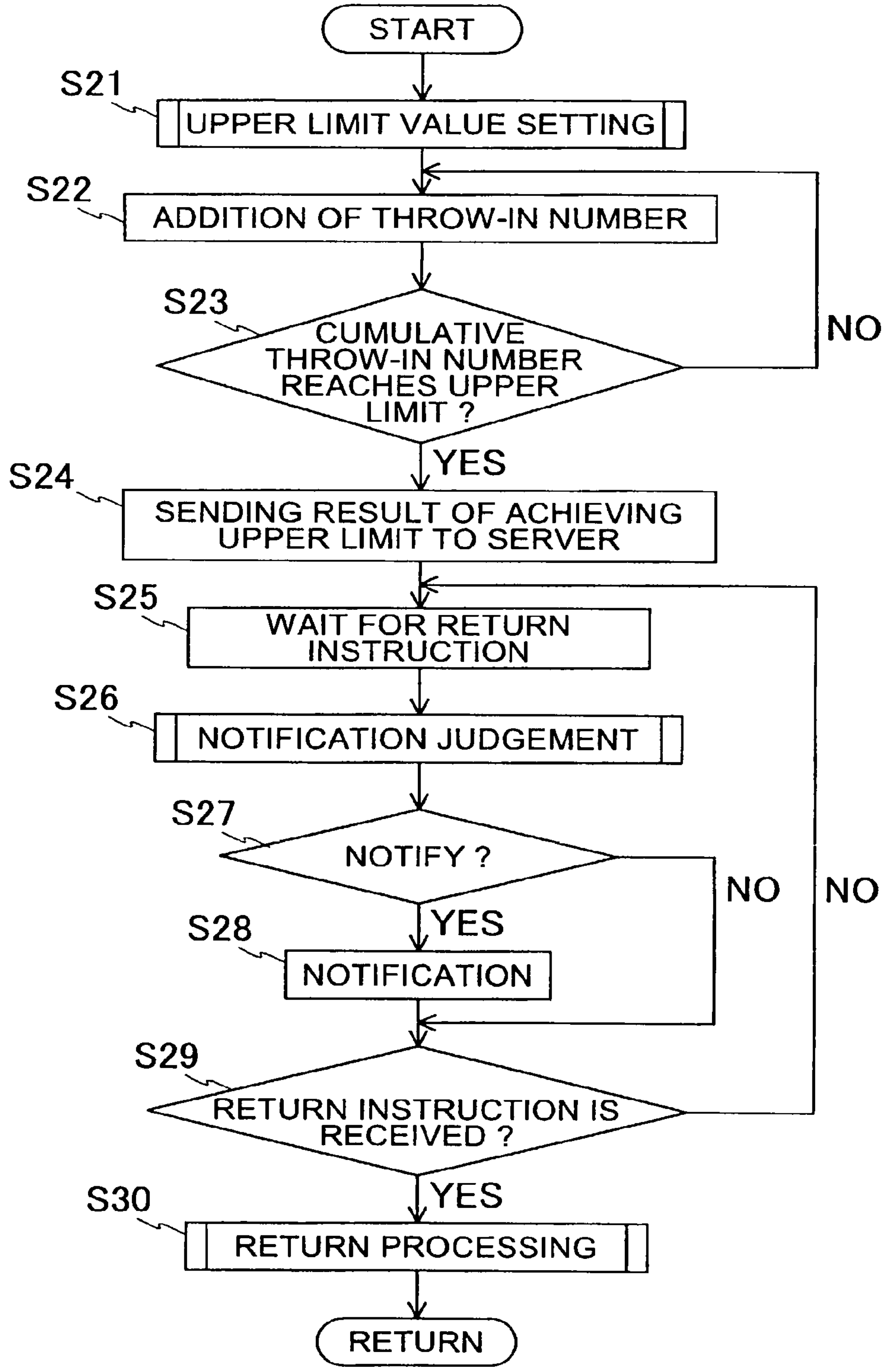
FIG. 7 is a flowchart showing the flow of operation of the game machine.

FIG. 7 is a flowchart showing the flow of operation of the game machine. The procedure shown in this flowchart is a processing routine that is performed concurrently with the subroutine of the game machine 2 shown in FIG. 6. This processing routine is started when a player's play status is detected.

Referring to FIG. 7, as soon as a player starts a game on the game machine 2, the CPU 33 with the game machine 2 sets an upper limit value that is used as a standard on return execution (step S21). The term "upper limit value" means the number of medals etc. as a game medium (a credit cumulative consumption), which are used for performing a game on a slot game machine, for example.
Therefore, a return is executed through the slot game machine when the number of medals used by the player reaches the upper limit value.

This upper limit value setting is attainable by various styles. For example, there are the following styles of: i) using a preset upper limit value; ii) setting an upper limit by the owner of the game machine; and iii) automatically changing the upper limit according to the play status.

Following is the style of using a preset upper limit value among the above-mentioned styles. In this instance, the preset upper limit value is stored in the RAM 37, and the CPU 33 reads data of the upper limit value from the RAM 37 and completes the upper limit value setting.

Complete of the above-mentioned upper limit value set processing, the CPU 33 adds the number of medals thrown by the player as a game medium (step S22), based on the result of the processing of step S11 shown in FIG. 6.

A medal sensor (not shown) contained in the game machine 2 counts medals thrown in through the throw-in slot 15. Of the counted number data, the number of medals actually used for the game as a consumed medal data is stored by adding into a credit cumulative consumption data (data of medals consumed in the past). This cumulative consumption data is initialized when the player terminates the game. The player sensor 21 detects termination of a player's game (or player change). By resetting the cumulative consumption data before a player starts a game, a fair return according to the game medium (credit) consumption is guaranteed to all players.

The above-mentioned cumulative consumption data is stored in the RAM 37. The CPU 33 reads cumulative consumption data from the RAM 37 and adds consumption data during the above-mentioned sequence of games into the read cumulative consumption data, so that data of this addition result is stored in the RAM 37, as update cumulative consumption data.

Complete of the above-mentioned throw-in medal number addition processing, the CPU 33 judges whether the cumulative consumption reaches the upper limit (step S23).

This judgment is attainable by comparing i) the cumulative consumption data stored in the RAM 37 in step S22; and ii) the upper limit value set in step S21. That is, the CPU 33 compares the above two data stored in the RAM 37 and judges whether the number of medals that the player threw in the game machine 2 reaches the upper limit.

When the CPU 33 judges that the cumulative consumption does not reach the upper limit value, the CPU 33 returns the processing to step S22, and resumes the throw-in medal number addition processing.

On the other hand, when the CPU 33 judges that the cumulative consumption reaches the upper limit value, the CPU 33 sends the result of the judgment to the server 1 (step S24). Concretely, the CPU 33 with the game machine 2 sends i) a signal indicating that the cumulative consumption reaches the upper limit value; ii) data of the upper limit value set in step S21; and iii) data of return rate to be described later, to the server 1 via the communication interface circuit 41 with the game machine 2.

The signal indicating arrival at the upper limit is expressed for example by numerical value of "1". The signal indicating that the cumulative consumption reaches the upper limit is accompanied by a signal designating the game machine 2 (i.e., data that identify among a plurality game machines 2 under the control of the server 1). For example, if an identification-number, e.g., "123", is assigned to the game machine 2 among a plurality of game machines under the control of the server 1, a signal of "1-123", wherein the numerical value "1" as the signal indicating arrival at the upper limit is affixed ahead of the identification-number "123" of the game machine 2, is sent to the sever 1.

The upper limit value data is stored in the RAM 37, as described above. The upper limit value is data used for determining the number of return medals when a return is executed to the player. The number of return medals is calculated by multiplying the upper limit value by a return rate to be described later.

Further, the RAM 37 with the game machine 2 stores data about a return rate at which a return is executed with respect to the upper limit value of the game machine 2. This return rate data is displayed on the indicator 19 and says, for example, "when 2,5000 YEN is consumed, 5,000 YEN is returned," and the same is also sent to the server 1.

Complete of the upper-limit-arrival signal sending processing, the CPU 33 with the game machine 2 waits for a return instruction (step S25). The term "return instruction" means a signal that is sent from the server 1 to the game machine 2 of which cumulative consumption reaches the upper limit. This signal is also used for controlling the timing of return etc. All the while waiting for the return instruction, the game machine 2 allows for the player's play.

In the above-mentioned return instruction waiting status, the CPU 33 judges whether notification should be executed or not (step S26). The term "notification" means to notify the player that the number of medals thrown into the game machine 2 reaches the upper limit.

As a style of the notification judgment processing, there is one that merely judges whether notification should be executed, and one that judges the timing at which notification should be executed. Following is the former style.

By referring to data stored in the RAM 37, the CPU 33 judges whether this notification should be executed (step S27). The RAM 37 stores data about execution of notification. Concretely, data of "1" is assigned when notification is executed, and data of "0" is assigned when no notification is executed. These data may be preset or set properly by the owner of the game machine etc.

When the data stored in the RAM 37 is "1", the CPU 33 notifies a player that the cumulative throw-in medal number of the game machine 2 that this player is performing a game reaches the upper limit (step S28). This notification may be executed by using an illuminator contained in the game machine 2. Alternatively, the game machine 2 may have a display part that performs notification to the player. Any notification means for informing the player that he/she has passed through the upper limit may be employed, whether it be provided unitary with the game machine 2.

Complete of notification processing, or judge of non-execution of notification, the CPU 33 judges whether a return instruction is received (step S29).

This return instruction is one that the game machine 2 waits for sending from the server 1 in step S25. The server 1 sends this return instruction without fail to the game machine 2 employing a style that a return is executed every time the player reaches the upper limit, as well as the game machine 2 employing other style that a return is not always executed when the player reaches the upper limit.

The server 1 sends a return instruction signal at a predetermined timing to the game machine 2 via the communication interface 53. The CPU 33 with the game machine 2 receives the return instruction signal via the communication interface circuit 41 and input/output bus 32. Receive of no return instruction signal, the CPU 33 returns the processing to step S25 and waits for a return instruction again.

Receive of the return instruction, the CPU 33 executes return processing (step S30). This return processing is executed based on the return instruction issued from the server 1 in step S29, more specifically, based on data contained in the return instruction that indicate a return rate at which a return is executed to the game machine 2.

In the above-mentioned game machine employing the style that a return is executed every time the throw-in medal number reaches the upper limit, a return is executed with the number of medals that is calculated on the server 1, mainly based on: i) the upper limit data stored in the RAM 37; and ii) return rate data. Based on the return instruction from the server 1, the CPU 33 enters a return mode by changing a return mode flag to "1", and directs the RAM 37 to temporarily store a return-medal number. In this return mode, the contents of the internal lottery processing (step S13) and medal payout processing (step S18) are different from that shown in the procedure shown in FIG. 6. Concretely, enter of the return mode, the CPU 33 forcedly produces a "big prize" in the above-mentioned internal lottery processing (step S13) in the ongoing procedure. Then, the CPU 33 reads the return-medal number contained in the received return instruction, in the above-mentioned medal payout processing (step S18), and pays out the number of medals corresponding to the read return-medal number. Return-medal number calculation processing on the server 1 will be described later. Complete of the medal payout processing (step S18) in the return mode, the CPU 33 changes the return mode flag to "0", and returns to the normal game mode.

In a game machine 2 to which a return has been executed, the CPU 33 with this game machine 2 resets consumption data stored in the RAM 37. This way, consumption counting is renewed every time reset is performed. This consumption data reset is executed according to program that is stored in the ROM 36.

Complete of this return processing, the CPU 33 returns to the upper limit value setting processing shown in FIG. 7 (step S21), and repeats the above-mentioned sequence of processing.

Although the return is executed by forcedly producing the "big prize" in the foregoing, a probability table that is stored in the RAM 37 and used for producing a big prize may be altered. This probability table is used for setting the range of random numbers generated by the random generator 38 (see FIG. 4) which can produce a big prize. A narrow range set by this probability table permits a low probability of "bit prize", whereas a wide range permits a high probability. Therefore, when a return instruction is sent from the server 1 to a game machine 2, the CPU 33 with this game machine 2 alters the probability table based on the received return instruction. At this time, a return is executed by increasing the probability of "big prize."

In this preferred embodiment, it is possible to employ a style that a return is not always executed when the throw-in medal number of the game machine 2 reaches the upper limit. In this instance, when no return is executed, the CPU 33 resets consumption data stored in the RAM 37, as required. This way, consumption counting is renewed every time reset is performed.

[Operation of Game Server]

Figure 8:
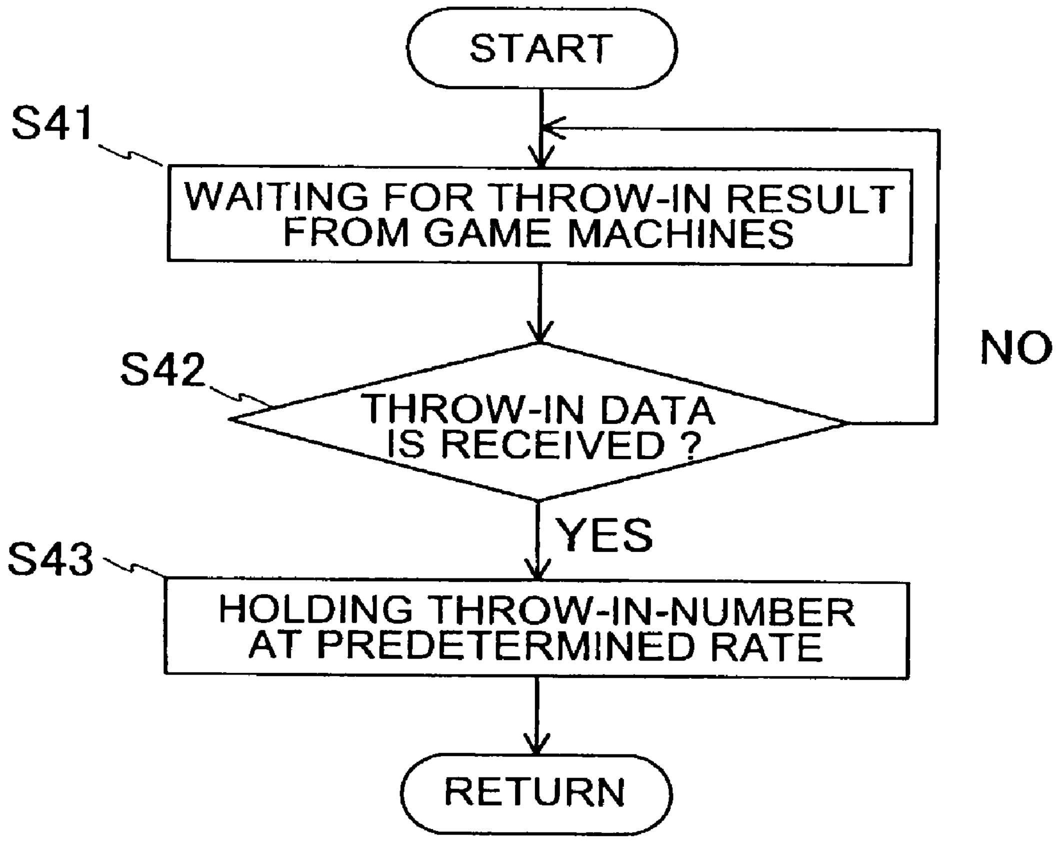
FIG. 8 is a flowchart showing the flow of operation when the game server prepares for a return.

FIG. 8 is a flowchart showing an operation flow when a game server prepares a return. This operation is to be repeated all the time on the server 1.

Referring to FIG. 8, the server 1 always holds some of medals that are game media thrown in each game machine 2, in order to execute a return to a game machine 2 under control of the server 1, when it reaches the upper limit. That is, the CPU 51 with the server 1 is waiting for the result of throw-in game medium from each game machine 2 (step S41).

As the game medium that the player uses on each game machine 2, it is possible to use any tangible matters such as medals, winning balls, and coins, each being used generally. Besides these tangible matters, any intangible matters may be used which can be expressed in numerical value data and be sent and received during play.

The term "throw-in" means the following action that a player makes a game machine recognize a game medium used for playing a game, irrespective of the game medium style. Therefore, not only a medal etc. that is thrown in through the throw-in slot 15 and detected by the medal sensor (not shown) contained in the game machine 2, but also numerical value data that the player decides to use for playing a game becomes a candidate for wait.

In the status that the server 1 is waiting for a game medium throw, the CPU 51 with the server 1 judges whether game medium throw-in data is received at a predetermined timing (step S42).

In this preferred embodiment, medals are used as a game medium, and the player continues a game on each game machine 2, while throwing in medals via the throw-in slot 15. The medal sensor with the game machine 2 detects the throw-in medals, so that they are counted and made into a numerical value as data. This numerical value data is stored in the RAM 37 with the game machine 2, as cumulative consumption data. This cumulative consumption data is sent at a predetermined timing to the server 1 via the communication interface circuit 41.

The server 1 receives this cumulative consumption data via the communication interface 53, so that a predetermined percent of this data is properly stored (held) in the memory 52, based on an instruction of the CPU 51.

When the above-mentioned throw-in data is not received in the judgment processing in step 42, the CPU 51 returns the processing to step S41. Receive of the throw-in data, the CPU 51 holds a predetermined percent of consumption (step S43).

As stated above, the server 1 holds in advance some of game media that are used for a return to the game machine 2 under control of the server 1. The hold amount differs from one server to another. The hold mount can be calculated by multiplying a predetermined rate by the cumulative consumption data of each game machine 2 that the server 1 receives.

In this hold processing, the server 1 sends a numerical value data corresponding to the hold amount calculated by the CPU 51, to the game machine 2 via the communication interface 53. Receive of the numerical value data, the CPU 33 with the game machine 2 directs the RAM 37 to store, as hold data, the numerical value data that is part of the cumulative consumption data.

Complete of the hold processing, the CPU 51 returns the processing again to the throw-in data waiting processing in step S41, and repeats the above-mentioned sequence of processing.

Figure 9:
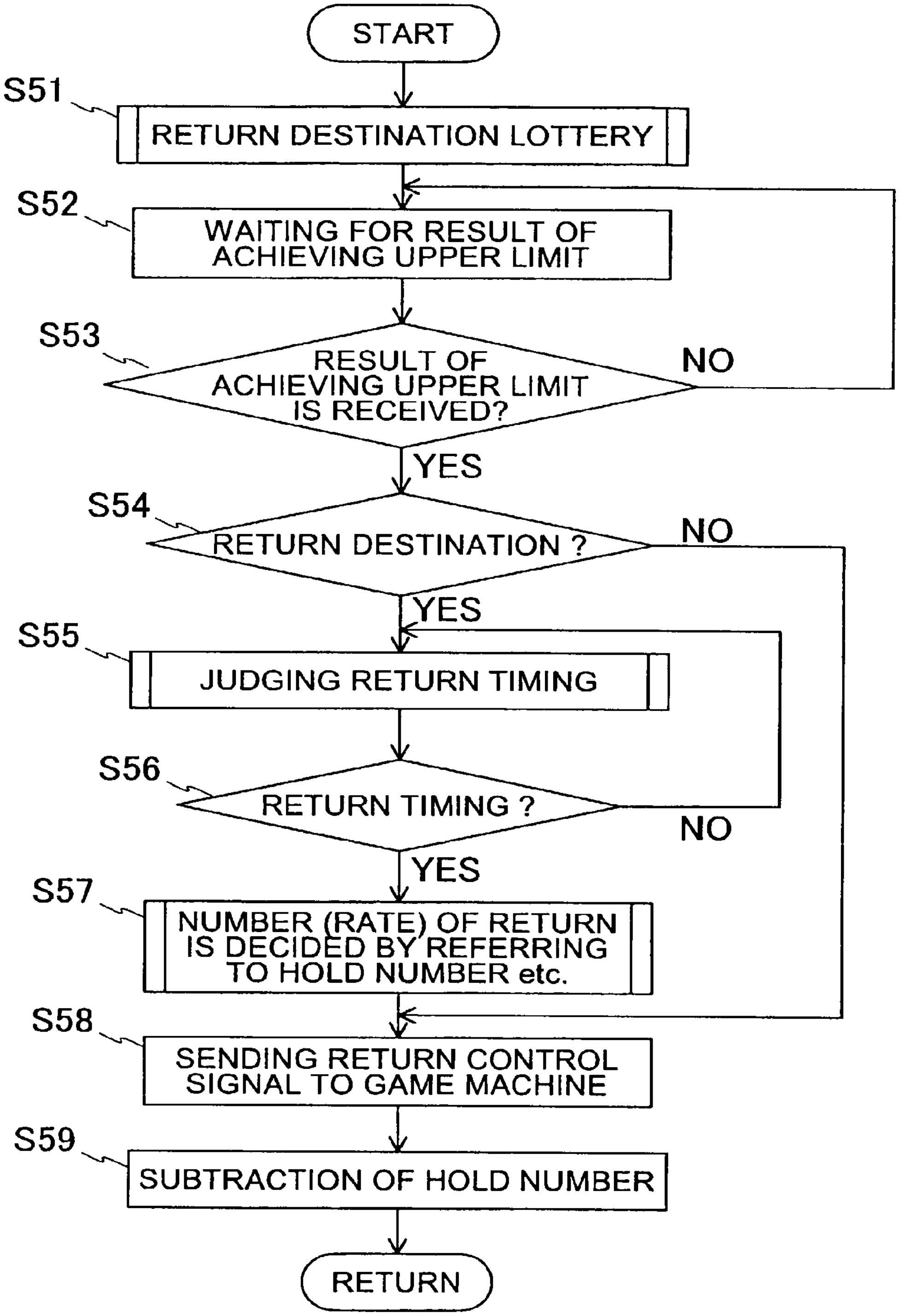
FIG. 9 is a flowchart showing the flow of operation when the game server performs the return.

FIG. 9 is a flowchart showing an operation flow when a game server executes a return. This operation is to be repeated all the time. Referring to FIG. 9, firstly, the CPU 51 with the server 1 determines a return destination by lottery (step S51).

This return destination lottery is performed when employing the style that a return is not always executed to the game machine 2 reaching the upper limit. As a lottery style, there are for example: i) "a return is executed to a game machine that is the N-th to reach the upper limit," and ii) "a return is executed to a game machine, the end of which machine-number meets a lottery-number." In the case of employing the style that a return is executed every time a game machine reaches the upper limit, there are for example lottery results that: i) "a return is executed to a game machine that is the fast to reach the upper limit;" and ii) "a return is executed to a game machine, the end of which machine-number meets 0, 1, . . . 9, as a lottery-number (i.e., all the machine numbers are designated)." Meanwhile, when employing the style of executing a return without fail, all the game machines that reach the upper limit are return candidates in step S51.

The CPU 51 directs these lottery results to be stored in the memory 52.

Complete of this return destination lottery processing, the CPU 51 waits for the upper limit arrival result sent from each game machine 2 (step S52). As described with reference to FIG. 6, the upper limit arrival result indicates that the game medium thrown in the game machine 2 reaches a preset amount. Concretely, the upper limit arrival judgment is made on the game machine 2. When this judgment result is that the game medium number reaches the upper limit, this result is sent to the server 1. The server 1 waits for the upper limit arrival result via the communication interface 53.

While the server 1 is waiting for the upper limit arrival result, the CPU 51 with the server 1 judges whether the upper limit arrival result is received at a predetermined timing (step S53). When the CPU 51 judges that the upper limit arrival result is received, the CPU 51 moves the processing to the step S54. On the other hand, when the CPU 51 does not judge so, the CPU 51 returns the processing to step S52, and repeats the processing in step S53.

Move to the processing of step S54, the CPU 51 judges whether the game machine 2 that has sent the upper limit arrival result is a return destination. This judgment is made based on the data produced by the lottery performed in step S51. That is, the CPU 51 refers to data stored in the memory 52 and compares this reference data with data appended to the upper limit arrival result. For example, when a lottery result is "a return will be executed to a game machine, the end of which machine-number meets a lottery-number," the CPU 51 reads data of the game machine's identification-number appended to the above lottery result and judges whether the end of this number is meets the lottery-number.

In the case of employing the style that a return is executed every time the upper limit arrival is attained, a positive result is always obtained in the return destination judgment processing.

When the CPU 51 judges that it is not the return destination, the CPU 51 sends a signal indicating non-execution of return in a processing of sending a return control signal to be described later. An instruction of the CPU 51 directs this signal to be sent to the game machine 2 via the communication interface 53.

Obtain of a positive result in the return destination judgment processing, the CPU 51 determines the timing of a return (step S55).

Various return timing styles can be considered. There are for example, i) to the game machine 2 that has reached the upper limit and corresponds to the return destination, a return is forcedly executed immediately after all the processing on the server 1 are completed; and ii) a return is executed after an elapse of a predetermined period of time from the completion of all the processing on the server 1.

This return timing judgment processing is to judge which one of the above two timings is to be used for executing a return. If a return timing is predetermined uniquely, this return timing is employed. On the other hand, in the case of determining a return timing by lottery, the CPU 51 randomly selects one from a plurality of candidates stored in the memory 52 (e.g., "immediately", "after the X-th game", and "when the next big prize occurs") in step S55.

Complete of the return timing judgment processing, the CPU 51 judges whether a return timing is established (step S56).

The above-mentioned return timing is determined in step S55 and stored in the memory 52 with the server 1. For example, if given, as this stored data, a temporal timing such as "after a few minutes from the upper limit arrival," a timer (not shown) contained in the server 1 is used to wait this timing. If given a timing corresponding to the player's game circumstances such as "after the player performs the 20th game from the upper limit arrival," various sensors contained in the game machine 2 are used and, when predetermined conditions are satisfied, the CPU 33 with the game machine 2 sends the server 1 a signal indicating the contents of this timing.

In other words, the server 1 performs the processing in step S56, in order to start a return-related processing when the return timing is established. When the CPU 51 judges that the return timing is not established, the CPU 51 returns the processing to step S55, and resumes the processing from step S55. On the other hand, when the CPU 51 judges that the return timing is established, the CPU 51 refers to the game medium amount (number) held in step S43, and determines the amount of return (step S57).

The return amount to the game machine 2 is managed by using the game media held in step S43 (see FIG. 8). Usually, reach of the upper limit arrival, a return is executed by the amount that is obtained by multiplying the upper limit by a preset return rate. In this instance, the server 1 calculates the return number based on the upper limit data contained in the upper limit arrival result and return rate data (these data are sent from the game machine 2). In addition to the usual return number, the server 1 executes more return at a predetermined probability, based on data indicating a return rate sent from the game machine 2. This return operation is a mode into which the CPU 51 enters by detecting the hold number stored in the memory 52. The CPU 51 determines a predetermined return number, irrespective of the data indicating the return rate sent from the game machine 2. This return number is far larger than that in other return, thereby further increasing game characteristics.

Complete of this return number determination processing, the CPU 51 sends a return control signal to the game machine 2 (step S58).

The return control signal sent from the server 1 to each game machine 2 can be classified into two types. To a game machine 2 that is judged as being return destination in the above-mentioned return destination judgment processing (step S54), the value of "1" indicating the return destination is appended to part of a return control signal. On the other hand, to a game machine 2 that is judged as not being return destination, the value of "0" indicating so is appended to part of a return control signal. In the case of employing the style that a return is executed every time the upper limit arrival is attained, the value of "1" may be set to every return control signal.

Additionally, the above-mentioned return control signal also contains data for determining the degree of return.

An instruction of the CPU 51 directs the entire data including this data (i.e., a return control signal) to be sent to a game server 2 via the communication interface 53. Receive of the return control signal, the game machine 2 performs a return based on this return control signal.

Complete of the above-mentioned control signal sending processing, the CPU 51 subtracts a hold number (step S59).

The term "hold number" means the number of game media held in the memory 52 with the server 1, in step S43 shown in FIG. 8. This hold game media are used for executing a return to each game machine 2. It is therefore necessary to subtract the number of game media corresponding to the payout number every time the return is completed.

In this hold number subtraction processing, data updated by the subtraction is newly stored in the memory 52.

In the instance that the return number to the game machine 2 is changed depending on the play status, the following construction may be employed. Complete of the return to the game machine 2, the CPU 33 with the game machine 2 sends the server 1 data indicating the payout number to the player. Receive of this data, the server 1 moves to the subtraction processing.

Complete of the above-mentioned hold amount subtraction processing, the CPU 51 returns the processing to step S51, and resumes the processing from the return destination lottery processing.

[Operations and Effects]

This preferred embodiment produces mainly the following operations and effects.

(1) A game medium (credit number) thrown in each game machine 2 is temporarily stored in each game machine 2. Thereafter, game media stored up to that time are sent to the server 1, as a credit cumulative consumption. Therefore, the server 1 holds the number of game media obtained by multiplying the cumulative consumption of credit (game media) on each game machine 2, by a predetermined rate. Based on this hold number, the server 1 performs a return at a predetermined return rate to a game machine 2 on which the game medium cumulative consumption by a single player has a predetermined value or more. With this construction, a return is guaranteed to a player who continues a game on the same game machine for a while. This avoids that the player waiting for a prize for a long time keeps away from the hall (i.e., a reduction in the number of customers). In other words, such a reduction in the number of customers is avoidable by guaranteeing a predetermined return to the player who has consumed a predetermined amount. As the result, the player will continue the game in expectation of the return.

(2) Some of players may terminate the game before receiving a return. In this occasion, the hold number stored in the server 1 is increased thereby to increase the amount of return.

While but one embodiment of the invention has been shown and described, it will be understood that many changes and modifications may be made therein without departing from the spirit or scope of the present invention.

For example, although in the foregoing preferred embodiment the server calculates a predetermined rate of cumulative consumption sent from each game machine and stores this calculation result as a hold number, each game machine may send the server the result calculated in advance.

What is claimed is:

1. A gaming system, comprising:

a plurality of game machines, each of which:

is brought into a status enabling start of a game based on an amount of deposited coins or a given credit number, makes a payout according to a result of the game, and sends game information associated with play of the game on the game machine; and a game server having a processor programmed to:

collectively control the plurality of game machines, judge, based on the game information, excluding information associated with a game result, sent from one of the plurality of game machines, whether a cumulative credit consumption, corresponding to the amount of coins deposited or the credit number bet and consumed by only one player continuously playing or assumed to be continuously playing the game on the one game machine has reached a preset upper limit value not based on an amount of the payout irrespective of the game result for the one game machine, and send, based on the judgment, a control signal to the one game machine for executing a return to the one player after the cumulative credit consumption has reached the preset upper limit value, wherein, the cumulative credit consumption data is reset at the end of the game by the player, and the number of inserted coins or credit number is added to the cumulative credit consumption data, which is data of cumulative consumption of coins or credit number.

2. The gaming system according to claim 1, wherein the game server computes a return amount by multiplying the preset upper limit value by a predetermined return rate, and the sent control signal includes the computed return amount.

3. The gaming system according to claim 1, wherein the one game machine is configured to provide a notification that the one game machine has reached the preset upper limit value.

4. The gaming system according to claim 1, wherein the game server:

computes the number of coins or the credit number consumed in the one game machine by adding only positive contributing values associated with the play of the game on the one game machine played continuously by, or assumed to be played continuously by the one player, and sends the control signal to the one game machine after it is judged that the cumulative credit consumption reaches the preset upper limit value for the one game machine.

5. The gaming system according to claim 4, wherein, the game server computes a return amount by multiplying the preset upper limit value by a predetermined return rate, and the sent control signal includes the computed return amount.

6. The gaming system according to claim 4, wherein the one game machine displays a notice to the player that the cumulative credit consumption has reached the upper limit value.

7. A gaming system, comprising:

a plurality of game machines, each of which:

is brought into a status enabling start of a game based on an amount of deposited coins or a given credit number, makes a payout according to a result of the game, and sends game information associated with play of the game on the game machine; and a game server having a processor programmed to:

collectively control the plurality of game machines, judge, based on the game information, excluding information associated with a game result, sent from one of the plurality of game machines, whether a cumulative credit consumption, corresponding to the amount of coins deposited or the credit number bet and consumed by only one player continuously playing or assumed to be continuously playing the game on the one game machine has reached a preset upper limit value not based on an amount of the payout for the one game machine irrespective of the result of the game, and send, based on the judgment, a control signal to the one game machine for executing a return to the one player after the cumulative credit consumption has reached the preset upper limit value, wherein, each of the plurality of game machines includes a sensor configured to detect a player's involvement, and upon detection of the player's involvement by the sensor, the applicable game machine is operative to set the preset upper limit value and to start calculating the cumulative credit consumption, the cumulative credit consumption data is reset at the end of the game by the player, and the number of inserted coins or credit number is added to the cumulative credit consumption data, which is data of cumulative consumption of coins or credit number.

8. A gaming system according to claim 7, wherein:

the sensor detects that one player performing a game on a game machine terminates a game, or that one player performing a game on a game machine changes to another player, and the game server sends the control signal to the one game machine if the server considers one player to be a player that has continuously played a game up to the preset upper limit value on the game machine based on the sensor detecting that one player playing a game on the one game machine has not terminated a game or changed to another player, and sends a signal for resetting the cumulative value, in correspondence with the amount of coins deposited or the credit number consumed in the game machine while one player plays a game on the game machine, based on the sensor detecting that one player playing the game on the game machine terminates a game or changes to another player.

9. A gaming system according to claim 7, wherein the control signal permits a return to a player from a part of a sum obtained by reserving a portion of coin or credit consumption on the plurality of game machines.

10. A game server configured to communicate with a plurality of game machines, each of which:

is brought into a status enabling start of a game based on an amount of deposited coins or a given credit number, makes a payout according to a result of the game, and sends game information associated with play of the game on the game machine, the game server comprising:

a controller operative to:

judge, based on the game information, excluding the game information associated with the game result, sent from one of the plurality of game machines, whether a cumulative credit consumption, corresponding to the amount of coins deposited or the credit number bet and consumed by only one player continuously playing or assumed to be continuously playing the game on the one game machine, has reached a preset upper limit value irrespective of the game result, and send, based on the judgment, a control signal to the one game machine for executing a return to the one player after the cumulative credit consumption has reached the preset upper limit value, wherein, the cumulative credit consumption data is reset at the end of the game by the player, and the number of inserted coins or credit number is added to the cumulative credit consumption data, which is data of cumulative consumption of coins or credit number.

11. The game server according to claim 10, wherein, each of the plurality of game machines includes a sensor for detecting that one player playing a game on that game machine terminates a game or changes to another player, and the controller sends the control signal to the one game machine if the server considers one player to be a player that has continued playing a game up to the predetermined upper limit on the one game machine based on the sensor detecting that one player playing a game on the one game machine has not terminated a game or changed to another player, and sends a signal for resetting the cumulative value, in correspondence with the amount of coins or credit number consumed in the one game machine while one player plays a game on the one game machine, based on the sensor detecting that one player playing a game on the one game machine terminates a game or changes to another player.

12. A gaming server according to claim 10, wherein the control signal permits a return to a player from a part of a sum obtained by reserving some of the amount of coins deposited or credit consumption on the plurality of game machines.

13. A game machine that is configured to communicate with a game server, be brought into a status enabling start of a game based on an amount of coins deposited or a given credit number, and make a payout according to a result of the game, comprising:

a controller operative to:

send game information associated with play of the game on the game machine to the game server, receive a signal from the game server representing a judgment that the sent game information, excluding the sent game information associated with the game result, is indicative that a cumulative credit consumption, corresponding to the amount of coins deposited or the credit number bet and consumed by only one player continuously playing or assumed to be continuously playing the game on the game machine, has reached a preset upper limit value, irrespective of the game result, and execute a return to a player performing a game on the game machine, in response to receipt of the signal after the cumulative value has reached the preset upper limit value, wherein, the cumulative credit consumption data is reset at the end of the game by the player, and the number of inserted coins or credit number is added to the cumulative credit consumption data, which is data of cumulative consumption of coins or credit number.

14. A method for collectively controlling a plurality of game machines, each of which is brought into a status enabling start of a game based on an amount of deposited coins or a given credit number, and makes a payout according to a result of the game, the method comprising:

receiving game information associated with play of the game on the plurality of game machines;

judging with a processor, based on the received game information associated with the play of the game on one of the plurality of game machines performed by one player, but excluding the received game information associated with the game result, whether a cumulative credit consumption corresponding to the amount of coins deposited or the credit number bet and consumed by only the one player continuously playing or assumed to be continuously playing the game on the one game machine has reached a preset upper limit value not based on an amount of the payout for the one game machine irrespective of the game result; and sending, based on the judgment, a control signal to the one game machine for executing a return after the cumulative credit consumption has reached the preset upper limit value, wherein, the cumulative credit consumption data is reset at the end of the game by the player, and the number of inserted coins or credit number is added to the cumulative credit consumption data, which is data of cumulative consumption of coins or credit number.

15. The method according to claim 14, further comprising:

directing a setting of the preset upper limit value and starting of a calculation of the cumulative value responsive to receipt of an indication of detection of a player's involvement.

16. The game control method according to claim 14, wherein the control signal is sent to the one game machine based also on one player being considered to be a player that has continued playing a game up to the preset upper limit value on the one game machine because one player performing a game on the one game machine has not terminated a game or changed to another player, and further comprising:

sending a signal for resetting the cumulative value, in correspondence with the amount of coins deposited or credit number consumed in the one game machine while one player plays a game on the one game machine, based on receipt of an indication that one player playing a game on the one game machine has terminated a game or changed to another player.

17. A game machine which is brought into a status enabling start of a game based on an amount of deposited coins or a given credit number, and makes a payout according to a result of the game, the game machine comprising:

a central processing unit (CPU);

a read only memory (ROM) having stored therein program instructions that when executed by the CPU controls the game machine;

a random access memory (RAM) capable of storing a cumulative credit consumption corresponding to a sum of the amount of coins deposited or the credit number given to enable the start of a game by a single player playing the game on the game machine; and a sensor capable of detecting an involvement of the player, wherein the CPU executes the program instructions stored in the ROM to:

start computation of the cumulative value and set a preset upper limit value in response to an involvement of the player being detected by the sensor, update the cumulative credit consumption by increasing the cumulative credit consumption currently stored in the RAM in accordance with the amount of coins deposited or credit number given by only the single player at the start of a game irrespective of the game result under the condition that the single player has been continuously playing or assumed to be continuously playing the games on the game machine, compare the updated cumulative credit consumption and the preset upper limit value to judge whether or not the updated cumulative credit consumption has reached the preset upper limit value irrespective of the game result, and execute a return if it is judged that the updated cumulative credit consumption has reached the preset upper limit value after the cumulative credit consumption has reached the preset upper limit value, wherein, the cumulative credit consumption data is reset at the end of the game by the player, and the number of inserted coins or credit number is added to the cumulative credit consumption data, which is data of cumulative consumption of coins or credit number.

18. A game machine which is brought into a status enabling start of a game based on an amount of deposited coins or a given credit number, and makes a payout according to a result of the game, the game machine comprising:

a central processing unit (CPU);

a read only memory (ROM) having stored therein program instructions that when executed by the CPU controls the game machine;

a random access memory (RAM) capable of storing a cumulative credit consumption corresponding to the amount of coins deposited or the credit number given to enable the start of a game by a single player playing the game on the game machine; and a sensor capable of detecting an involvement of the player, wherein the CPU executes the program instructions stored in the ROM to:

start computation of the cumulative credit consumption and a preset upper limit value in response to the involvement of the player being detected by the sensor, update the cumulative credit consumption by increasing the cumulative value currently stored in the RAM in accordance with the amount of coins deposited or credit number given by only the single player at the start of a game irrespective of the game result under the condition that the single player has been continuously playing or assumed to be continuously playing the games on the game machine, compare the updated cumulative credit consumption and the preset upper limit value to judge whether or not the updated cumulative credit consumption has reached the preset upper limit value irrespective of a game result, and execute a return irrespective of the game result if it is judged that the updated cumulative credit consumption has reached the preset upper limit value, wherein, the cumulative credit consumption data is reset at the end of the game by the player, and the number of inserted coins or credit number is added to the cumulative credit consumption data, which is data of cumulative consumption of coins or credit number.

19. The gaming system according to claim 1, wherein, in each gaming machine, the number of inserted game coins or credit number is stored at the machine, the total number of the cumulated coins or credit number accumulated by the same player at each machine is sent to the server at a predetermined timing as the cumulative credit consumption, for each machine, each time the server receives a cumulative credit consumption from each machine, a predetermined percentage of the sent cumulative credit consumption is added as a hold number stored at the server, and when the hold number reaches a predetermined upper limit, the server executes a return to the player.

20. The gaming system according to claim 19, wherein if the player terminates the game before receiving a return, the hold number is increased thereby to increase the amount of return to be executed next.

* * * * *